United States Patent
Nimylowycz

[15] 3,666,215
[45] May 30, 1972

[54] ROCKET CATAPULT EJECTOR ARRANGEMENT

[72] Inventor: Osyp Nimylowycz, Philadelphia, Pa.
[73] Assignee: The United States of America as represented by the Secretary of the Army
[22] Filed: May 7, 1970
[21] Appl. No.: 35,373

[52] U.S. Cl. .................................................. 244/122 AB
[51] Int. Cl. .................................................. B64d 25/10
[58] Field of Search ........................................ 244/122 AB

[56] References Cited

UNITED STATES PATENTS 3,282,161   11/1966   MacDonald, Jr. et al. .......244/122 AB Primary Examiner—Milton Buchler
Assistant Examiner—Carl A. Rutledge
Attorney—Harry M. Saragovitz, Edward J. Kelly, Herbert Berl and S. Dubroff

[57] ABSTRACT

A rocket catapult ejector arrangement for ejecting an occupant-seat mass from a disabled aircraft in which a swiveling rocket nozzle is assembled at a tilted position with a launch tube extending through a nozzle throat portion having an eliptical configuration and lying in a plane that is non-perpendicular to the longitudinal axis of the nozzle member. This minimizes ball joint leakage around the nozzle and provides more uniform gas flow and thrust during operation.

5 Claims, 4 Drawing Figures

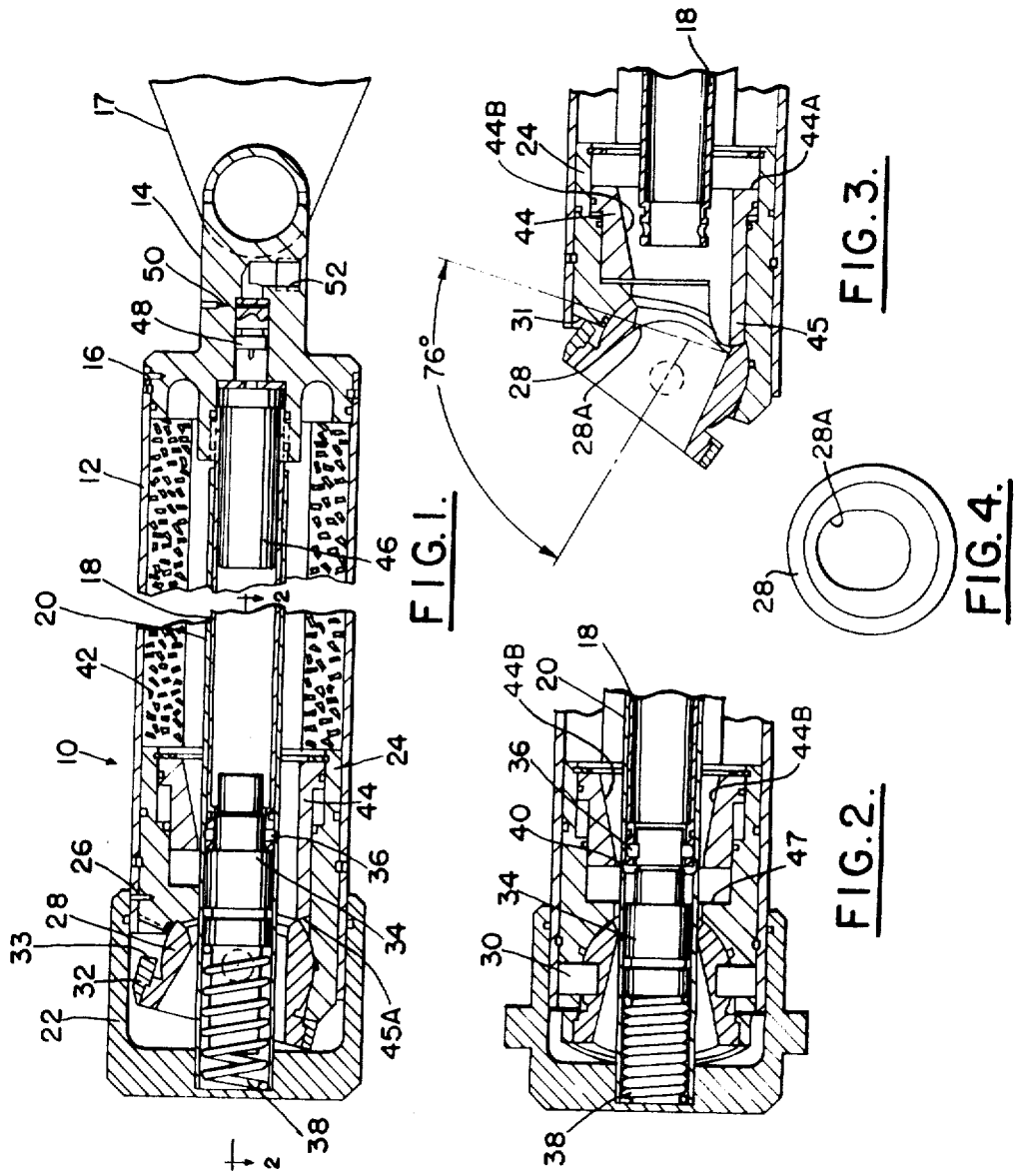

ROCKET CATAPULT EJECTOR ARRANGEMENT

The invention described herein may be manufactured, used, and licensed by or for the Government for governmental purposes without the payment to me of any royalty thereon.

This invention relates to rocket catapult ejector arrangements, and more particularly, to a rocket catapult ejector arrangement for ejecting a mass from a disabled aircraft.

It is an object of this invention to provide a rocket catapult ejector arrangement which permits quick assembly and disassembly of nozzle section components.

Another object of the invention is to provide such an arrangement that assures a more uniform gas flow and thrust during operation.

A further object of the invention is to provide such an arrangement in which ball joint leakage at the nozzle mounting is minimized.

These and other objects, features and advantages will become more apparent from the following description and accompanying drawings in which:

FIG. 1 is a longitudinal sectional view partially broken of a preferred ejector unit prior to operation embodying the principles of the invention.

FIG. 2 is a sectional view taken along line 2—2 of FIG. 1 during an initial stage of operation.

FIG. 3 is a partial sectional view of a launched rocket construction similar to its FIG. 1 orientation and with its nozzle in a fully opened position.

FIG. 4 is a view along the longitudinal axis of the nozzle from its rearward end.

The rocket catapult ejector assembly, shown generally at 10, (FIG. 1) has a main body motor tube 12 to which a head member 14 is secured by suitable pins or screws 16. Head 14 is appropriately secured to an ejectable occupant-seat mass 17 when its aircraft is disabled. Concentrically arranged within motor tube 12 is a pair of telescoping tubes 18, 20. The inner booster tube 18 is secured to head 14 and the outer launch tube 20 is suitably secured to an aircraft attachment member or mount 22 which slidably receives the rearward portion of motor tube 12.

Secured within the rearward end of motor tube 12 by appropriate pins or screws 26 is a retaining member and housing 24 having suitable rearwardly facing concave surface portions that enable tilting or rocket nozzle 28 which is rotatably mounted on diametrically opposed trunnion lugs 30 extending inwardly from housing 24 (FIG. 2). The launch tube 20 extends forwardly through the nozzle apertured throat portion 28A which is of elliptical configuration and lies in a plane that intersects the nozzle longitudinal axis at an angle of 76°. This permits the nozzle 28 to be assembled at a tilt or incline of 14° (FIG. 1) and the particular position of the cam projection or abutment surface 33 on nozzle adjustable stop ring 32 enables further camming or tilting to a desired angle (FIG. 3) that preferably is in the range of 36° to 52°. The effective cam projection 33 is selected by slightly rotating ring 32 on nozzle 28 and securing by a set screw (not shown) for contacting the rearward projection 31 on retainer 24.

The outer tube 20 and inner tube 18 are locked together by means of a plunger or cam member 34 cooperating with a split collet or key 36 that initially engages outer tube annular groove 40 to lock the catapult ejector assembly to an aircraft during standby condition. When the spring 38, surrounding the reduced rearward portion of plunger 34, is compressed as a result of cartridge 46 being ignited by its firing pin 48, the catapult gas pressure also moves rearwardly the reduced forwardmost portion of plunger 34 (prior to separating motion of tubes 18 and 20) such that key 36 is cammed or squeezed inwardly by a forward surface of groove 40 to unlatch the tubes 18, 20 prior to rocket or booster phase of propulsion. The firing pin 48, anchored to head 14 by shear pin 50, is actuated by gas applied under pressure through an inlet port 52. The catapult gases from cartridge 46, after separation of tubes 18 and 20, pass around the rearward edge of tube 18 and ignite a cylindrically shaped solid propellant 42 positioned within motor tube 12 for the rocket action at which time these gases exhaust through nozzle 28.

The stepped annular internal surfaces of retainer 24 slidably receive mating external surfaces of cam sleeve 44, relative rotation of these two members being precluded by an appropriate tongue and slot arrangement with the tongue portion 45 (FIG. 3) of the cam sleeve slidable rearwardly through a longitudinal slot provided in the inwardly directed flange 47 of the retainer. The rearward edge 45A of tongue 45 engages the forward edge of nozzle 28 for camming or rotating the nozzle to a predetermined limit upon the pressure gases acting on the forward surface 44A and substantially conical internal surface portions 44B of cam sleeve 44.

I wish it to be understood that I do not desire to be limited to the exact details of construction shown and described, for obvious modifications will occur to a person skilled in the art.

I claim:

1. In a rocket catapult ejector arrangement for use in an aircraft to eject a mass therefrom and having a pair of telescoping launch and booster tubes respectively connected to an aircraft attachment member and an ejectable occupant seat attaching head, the innermost booster tube being connected to a main body motor tube,
   a retaining member carried by said motor tube,
   a rocket nozzle member rotatably mounted upon said retaining member and having an apertured throat portion, the launch tube extending through said nozzle throat portion, said throat portion being of elliptical configuration,
   said retaining member having a stepped annular internal surface forwardly of said nozzle member,
   a cam sleeve slidably mounted for longitudinal movement rearwardly along said retaining member internal surface, and
   key means removably extending into both of said telescoping tubes.

2. The structure in accordance with claim 1 wherein said throat portion lies in a plane that is non-perpendicular to the longitudinal axis of the nozzle member.

3. The structure of claim 1 wherein said motor tube is slidably mounted in said aircraft attachment member.

4. The structure of claim 1 wherein said retaining member has an inwardly directed flange rearwardly of said stepped annular internal surface, said flange having a longitudinal groove therein, and said cam sleeve having a rearwardly protruding tongue slidable in said groove for camming said nozzle member.

5. The structure in accordance with claim 4 wherein said cam sleeve has forwardly facing substantially conical internal surface portions.

* * * * *